Oct. 25, 1938.  C. G. GREEN  2,133,985
FLEXIBLE CURRENT CONNECTION FOR OSCILLATING FANS
Filed Jan. 25, 1937
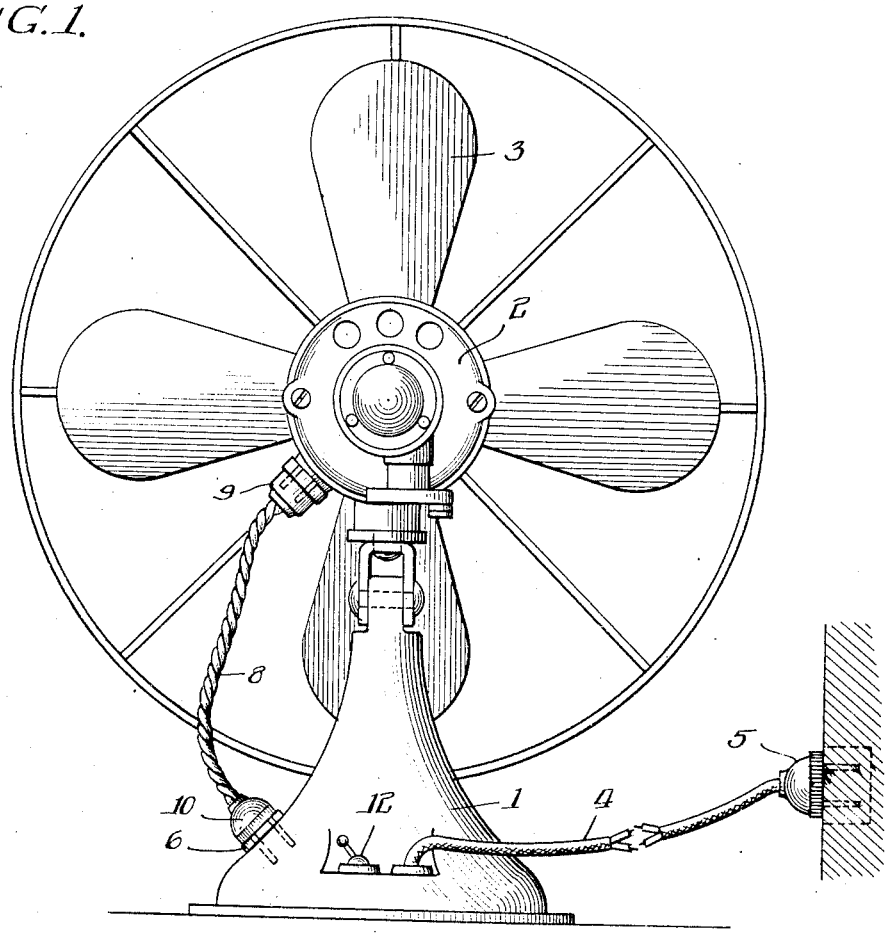
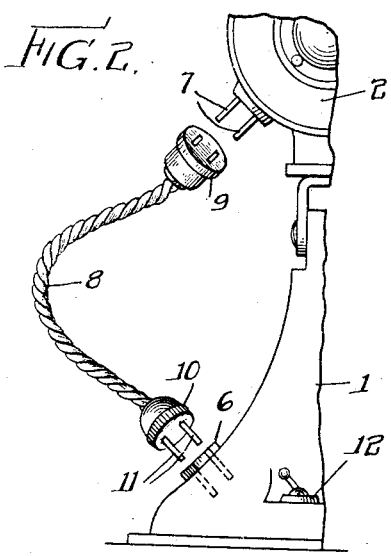
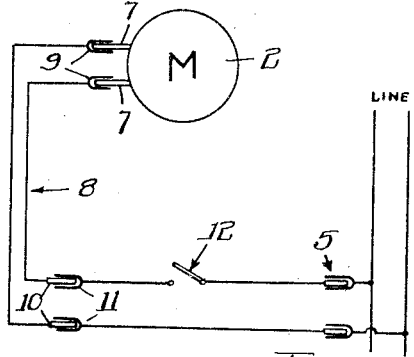
Inventor
Charles G. Green
By Arthur F. Durand atty.

Patented Oct. 25, 1938

2,133,985

UNITED STATES PATENT OFFICE 2,133,985

FLEXIBLE CURRENT CONNECTION FOR OSCILLATING FANS

Charles G. Green, Chicago, Ill., assignor to Alfred Decker & Cohn, Inc., Chicago, Ill., a corporation of Illinois Application January 25, 1937, Serial No. 122,157

3 Claims. (Cl. 230—259)

This invention relates to electric fans, and more particularly to those in which the motor and rotary fan oscillate back and forth laterally. In fans of this kind, there is a flexible electrical connection between the stationary base of the fan and the oscillating motor, which connection flexes first one way and then the other, as the motor oscillates back and forth. This continual flexing of the connection tends to break it in time, and a new connection must then be supplied. Ordinarily, this is done with some difficulty and inconvenience, inasmuch as it is necessary to obtain access to the interior of the motor and to the interior of the base, as the flexible connection extends through a hole in the motor casing to terminals within the latter, through a hole in the base to terminals inside thereof. Repair work of this kind has been found to be expensive.

The object of my invention, therefore, is to provide a novel and improved construction and arrangement whereby a separable plug connection is provided between the flexible cord and the motor, or preferably at both ends of the cord, whereby, in case of breakage of the flexible cord connection, the necessary repair work may be done easily and conveniently and with less expense than heretofore.

It is also an object to provide certain details and features of construction tending to increase the general efficiency and desirability of an oscillating fan cord connection of this particular character.

To these and other useful ends, the invention consists in matters hereinafter set forth and claimed and shown in the accompanying drawing, in which—

Fig. 1 is a rear elevation of an oscillating fan having a flexible cord connection embodying the principles of the invention.

Fig. 2 is a fragmentary view of the fan, showing the flexible cord connection disconnected and in perspective.

Fig. 3 is a diagram of the electrical circuits of the said fan.

As thus illustrated, the fan shown can be of any suitable known or approved design, having a stationary base 1, upon the upper end of which is mounted an oscillating motor 2, with fan blades 3 at one end of the motor shaft. The mechanism for oscillating the motor may be of any suitable character.

The ordinary flexible cord connection 4 extends to the base 1 of the fan, and has its outer end provided with an ordinary plug 5 for insertion in any suitable electrical outlet or socket. The base of the fan is also provided with a socket 6, of any suitable character, and the motor 2 is provided, at one side thereof, with exposed plug prongs 7, as shown. The flexible cord connection 8 has a socket plug 9 at the upper end thereof, with openings to receive the prongs 7, to provide a separable electrical connection of the ordinary and well known character. The lower end of the cord 8 has a prong plug 10, having prongs 11, as shown, for insertion in the socket openings of the socket 6, previously mentioned.

The complete electrical circuits of the motor are as shown in Fig. 3 of the drawing.

Should the cord 8 break or become impaired, as a result of the continual flexing thereof by the oscillating motor, it can be disconnected at both ends thereof, and a new cord with its plugs can be substituted for the one that has become broken or impaired by use of the fan.

The chief difficulty, when there are no separable connections between the cord 8 and the motor and base, is in obtaining access to the interior of the motor, to the terminals of the cord within the said casing. It is not as difficult to obtain access to the interior of the base, and hence the separable connection between the cord and the base could be omitted, if desired, although it is preferable to have a separable connection at each end of this cord.

It will be seen that by putting the prongs 7 on the motor casing, instead of on the plug part 9, and by putting the prongs 11 on the plug part 10, there is no danger of touching a live connection. If the prongs 7 are first inserted in the sockets of the plug part 9, there is then no current or potential on the prongs 11 until the latter are inserted in the socket part 6 of the lower plug connection. On the other hand, if the prongs 11 are inserted first, in the sockets of the plug part 6, there is then no current or potential on the prongs 7 until the latter are fully inserted in the plug part 9 at the upper end of the cord. Hence, there are never any exposed live terminals or contacts, even though the starting and stopping switch 12 in the main circuit may be closed.

Thus the cord 8 is connected between a stationary base 1 and motor 2 having a continual and rhythmic oscillatory motion, when the fan is running, but all forming a portable electric fan unit, and with the cord 4 and plug 5 the cord 8 is not used for connecting the motor to and disconnecting it from a source of current. Thus the cord 8 is essentially freely flexible, which means that it is practically non-resilient in character, in order not to constitute any retardation of the free oscillation of the motor and fan, when the latter is running. Also, this means, of course, that the lower end of this cord 8 is stationary, while its uper end is oscillatory, when the fan is running. In addition, the situation thus presented, involving the invention shown and described, means that both ends of the auxiliary or relatively long cord 4 are stationary, when the fan is running.

Thus the cord 8 is a part of a portable fan unit with both ends of the cord in place thereon.

The current can be turned on or off, very obviously, without disturbing either end of the cord connection 8, as the plug and socket connection at each end of this cord is not for the purpose of shutting off or turning on the current. To the contrary, in repairing the fan, should the cord 8 break, the plug 5 would be pulled out first, and the entire unit would then be submitted for repairs, for the substitution of a new cord for the broken one, and both plug connections 9 and 10 would be opened or separated after the disconnection of the plug 5 from the wall outlet. In other words, the plug connections 9 and 10 are not intended to be used as a switch, for turning on and off the current, and have no electrical switching function whatever, as all switching is done by means of the plug 5 and the switch 12 on the pedestal 1 of the fan. That means that the separable plug connections 9 and 10 have only a mechanical function, and are used only when a broken cord is taken off and a new one is substituted therefor.

Therefore, the invention contemplates broadly the provision of a plug connection 7 and 9, for a flexible cord 8, which does not need to be disturbed for any other purpose than for the one purpose of substituting a new cord for one that has been broken by the continual flexing thereof, and the same is true of the plug connection 6, 10 and 11, for here again the invention contemplates a plug connection that does not need to be disturbed for any purpose except for the substitution of a new cord for a broken one, for otherwise there is no need to disturb either plug connection, and hence both plug connections are in place when the fan is running, or when the fan is stored or not in use.

Of course, if desirable for any purpose, the cord 8 can be detached at both ends thereof, when it is desired to transport or store the fan, very obviously, so that what is meant is that the fan may be put out of use, by merely stopping the running thereof, or may be stored away or transported without the necessity of detaching the cord at the ends thereof, inasmuch as the only purpose for which such detachment is desirable or necessary is for the substitution of a new cord for one that has become broken or impaired by use.

What I claim as my invention is:

1. The combination of an oscillating fan motor, a stationary support therefor, a freely flexible cord connection between said support and motor, to feed current to the latter, and a separable plug connection between the cord and motor, with the latter having the prongs thereof, to facilitate the making of repairs when the cord breaks, the cord remaining undisturbed at both ends thereof when the fan is stored or not in use.

2. A structure as specified in claim 1, said cord having a separable plug connection with the support, with the latter having the prong sockets thereof.

3. A structure as specified in claim 1, and means other than said cord to cut off the current without disturbing either end thereof, interposed between the cord and a source of current.

CHARLES G. GREEN.